(12) United States Patent
Zu

(10) Patent No.: US 11,600,116 B2
(45) Date of Patent: Mar. 7, 2023

(54) METHODS AND APPARATUSES FOR RECOGNIZING GESTURE, ELECTRONIC DEVICES AND STORAGE MEDIA

(71) Applicant: BOE Technology Group Co., Ltd., Beijing (CN)

(72) Inventor: Chunshan Zu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 33 days.

(21) Appl. No.: 17/359,621

(22) Filed: Jun. 27, 2021

(65) Prior Publication Data

US 2022/0171962 A1 Jun. 2, 2022

(30) Foreign Application Priority Data

Nov. 30, 2020 (CN) .......................... 202011384655.5

(51) Int. Cl.
*G06V 40/20* (2022.01)
*G06V 40/10* (2022.01)

(52) U.S. Cl.
CPC ............ *G06V 40/28* (2022.01); *G06V 40/113* (2022.01); *G06T 2207/30196* (2013.01)

(58) Field of Classification Search
CPC .................. G06V 40/28; G06V 40/113; G06T 2207/30196; G06F 3/017
See application file for complete search history.

(56) References Cited

U.S. PATENT DOCUMENTS

| | | | | |
|---|---|---|---|---|
| 10,296,102 B1* | 5/2019 | Misra | .................... | G06V 40/103 |
| 2013/0278504 A1* | 10/2013 | Tong | ...................... | G06V 40/28 |
| | | | | 345/158 |
| 2014/0267031 A1* | 9/2014 | Huebner | ............... | G06F 3/0346 |
| | | | | 345/158 |
| 2014/0313122 A1* | 10/2014 | Tang | ........................ | G06F 3/017 |
| | | | | 345/156 |
| 2017/0206405 A1* | 7/2017 | Molchanov | .......... | G06K 9/6277 |
| 2018/0203515 A1 | 7/2018 | Nen et al. | | |
| 2019/0384407 A1* | 12/2019 | Smith | .................... | G06V 40/11 |

(Continued)

FOREIGN PATENT DOCUMENTS

| | | |
|---|---|---|
| CN | 102789568 A | 11/2012 |
| CN | 111382644 A | 7/2020 |

(Continued)

OTHER PUBLICATIONS

CN2020113846555 first office action.

*Primary Examiner* — Ming Y Hon
(74) *Attorney, Agent, or Firm* — IPro, PLLC (57) ABSTRACT

Provided are a method and an apparatus for recognizing a gesture, an electronic device and a storage medium. In one or more embodiments, the method includes: detecting at least one hand region from a video image and obtaining hand image information of each of the at least one hand region; obtaining hand motion information of each of the at least one hand region by tracking the at least one hand region; determining a gesture corresponding to each of the at least one hand region according to the hand image information and/or the hand motion information of each of the at least one hand region; wherein the gesture comprises at least one of a single-hand static gesture, a single-hand dynamic gesture, a double-hand static gesture or a double-hand dynamic gesture.

16 Claims, 4 Drawing Sheets

(56) References Cited

U.S. PATENT DOCUMENTS

| | | | |
|---|---|---|---|
| 2020/0097065 A1* | 3/2020 | Iyer | G06F 3/017 |
| 2020/0310619 A1* | 10/2020 | Gao | G06F 3/0416 |
| 2020/0387287 A1* | 12/2020 | Ravasz | G06F 3/011 |
| 2021/0096726 A1* | 4/2021 | Faulkner | G06F 1/1626 |
| 2021/0124915 A1* | 4/2021 | Li | G06K 9/627 |
| 2021/0333884 A1* | 10/2021 | Li | G06F 3/013 |
| 2021/0373672 A1* | 12/2021 | Schwarz | G06V 40/28 |

FOREIGN PATENT DOCUMENTS

| | | |
|---|---|---|
| CN | 111857356 A | 10/2020 |
| CN | 111860346 A | 10/2020 |

\* cited by examiner

METHODS AND APPARATUSES FOR RECOGNIZING GESTURE, ELECTRONIC DEVICES AND STORAGE MEDIA

CROSS REFERENCE TO RELATED APPLICATIONS

This application claims priority to Chinese Patent Application No. 2020113846555 entitled "METHOD AND APPARATUS FOR RECOGNIZING GESTURE, AND ELECTRONIC DEVICE AND STORAGE MEDIUM" filed on Nov. 30, 2020, the entire content of which is incorporated herein by reference.

TECHNICAL FIELD

The present disclosure relates to the field of gesture recognition technologies, and in particular to a method and apparatus for recognizing a gesture, and an electronic device and a storage medium.

BACKGROUND

Along with wide applications of various smart sensors, many smart terminals such as mobile phones, smart televisions, tablet computers, game consoles and smart joysticks can realize air gesture recognition. These air gestures can be generated by hand movement.

The air gestures are easy to operate, vivid and interesting.

SUMMARY

An aspect of the present application provides a method of recognizing a gesture, including:
detecting at least one hand region from a video image and obtaining hand image information of each of the at least one hand region;
obtaining hand motion information of each of the at least one hand region by tracking the at least one hand region;
determining a gesture corresponding to each of the at least one hand region according to the hand image information and/or the hand motion information of each of the at least one hand region; where the gesture includes at least one of a single-hand static gesture, a single-hand dynamic gesture, a double-hand static gesture or a double-hand dynamic gesture.

Optionally, detecting the at least one hand region from the video image includes: determining that there is only one hand region by detecting the video image; and
determining the gesture corresponding to each of the at least one hand region according to the hand image information and/or the hand motion information of each of the at least one hand region includes:
obtaining a first recognition result by performing a single-hand static gesture recognition for the hand image information of the hand region; and
in response to that the first recognition result is yes, determining that the gesture corresponding to the hand region is the single-hand static gesture.

Optionally, determining the gesture corresponding to each of the at least one hand region according to the hand image information and/or the hand motion information of each of the at least one hand region includes:
in response to that the first recognition result is no, obtaining a second recognition result by performing a first single-hand dynamic gesture recognition based on the hand motion information of the hand region; and in response to that the second recognition result is yes, determining that the gesture corresponding to the hand region is the single-hand dynamic gesture.

Optionally, determining the gesture corresponding to each of the at least one hand region according to the hand image information and/or the hand motion information of each of the at least one hand region includes:
in response to that the second recognition result is no, obtaining a third recognition result by performing a second single-hand dynamic gesture recognition based on the hand image information and the hand motion information of the hand region; and
in response to that the third recognition result is yes, determining that the gesture corresponding to the hand region is the single-hand dynamic gesture.

Optionally, detecting the at least one hand region from the video image includes: determining that there are at least two hand regions by detecting the video image; and
determining the gesture corresponding to each of the at least one hand region according to the hand image information and/or the hand motion information of each of the at least one hand region includes:
for any two hand regions, determining a confidence level of the two the hand regions belonging to two hands of a same person according to the hand image information and the hand motion information of the two hand regions;
in response to that one or more confidence levels are greater than a preset threshold, determining that the two hand regions with the highest confidence level belong to two hands of a same person;
obtaining a fourth recognition result by performing a double-hand static gesture recognition for the hand image information of the two hand regions belonging to two hands of a same person; and
in response to that the fourth recognition result is yes, determining that the gesture corresponding to the two hand regions is the double-hand static gesture.

Optionally, determining the gesture corresponding to each of the at least one hand region according to the hand image information and/or the hand motion information of each of the at least one hand region includes:
in response to the fourth recognition result is no, obtaining a fifth recognition result by performing a first double-hand dynamic gesture recognition based on the hand motion information of the two hand regions; and
in response to that the fifth recognition result is yes, determining that the gesture corresponding to the two hand regions is the double-hand dynamic gesture.

Optionally, determining the gesture corresponding to each of the at least one hand region according to the hand image information and/or the hand motion information of each of the at least one hand region includes:
in response to that the fifth recognition result is no, obtaining a sixth recognition result by performing a second double-hand dynamic gesture recognition based on the hand image information and the hand motion information of the two hand regions;
in response to that the sixth recognition result is yes, determining that the gesture corresponding to the two hand regions is the double-hand dynamic gesture.

Optionally, for any two hand regions, determining the confidence level that the two hand regions belonging to two hands of a same person according to the hand image information and the hand motion information of the two hand regions includes:
in response to that no confidence level is greater than the preset threshold, separately performing a single-hand gesture recognition for each of the at least one hand region; where the single-hand gesture recognition includes at least one of a single-hand static gesture recognition, a first single-hand dynamic gesture recognition, or a second single-hand dynamic gesture recognition.

Optionally, obtaining the hand motion information of each of the at least one hand region by tracking the at least one hand region includes:

obtaining one or more prediction results by predicting the hand motion information of each of the at least one hand region based on a prediction model; where the hand motion information includes a hand position and a hand motion speed;

matching the one or more prediction results with one or more detection results of the hand motion information of the at least one hand region in a current frame of video image;

updating one or more parameters of the prediction model using one or more of the detection results matched with the one or more prediction results;

tracking each of the at least one hand region; and obtaining the hand motion information of each of the at least one hand region by obtaining the hand motion information of a tracked same hand region.

Another aspect of the present application provides an electronic device, including: a processor; a memory, in communication connection with the processor; at least one program, stored in the memory and configured to be executed by the processor; where the at least one program is configured to:

detect at least one hand region from a video image and obtain hand image information of each of the at least one hand region;

obtain hand motion information of each of the at least one hand region by tracking the at least one hand region;

determine a gesture corresponding to each of the at least one hand region according to the hand image information and/or the hand motion information of each of the at least one hand region; where the gesture includes at least one of a single-hand static gesture, a single-hand dynamic gesture, a double-hand static gesture, or a double-hand dynamic gesture.

Optionally, when detecting the at least one hand region from the video image, the processor is configured to: determine that there is only one hand region by detecting the video image; and when determining the gesture corresponding to each of the at least one hand region according to the hand image information and/or the hand motion information of each of the at least one hand region, the processor is configured to:

obtain a first recognition result by performing a single-hand static gesture recognition for the hand image information of the hand region; and in response to that the first recognition result is yes, determine that the gesture corresponding to the hand region is the single-hand static gesture.

Optionally, when determining the gesture corresponding to each of the at least one hand region according to the hand image information and/or the hand motion information of each of the at least one hand region, the processor is configured to:

in response to that the first recognition result is no, obtain a second recognition result by performing a first single-hand dynamic gesture recognition based on the hand motion information of the hand region; and in response to that the second recognition result is yes, determine that the gesture corresponding to the hand region is the single-hand dynamic gesture.

Optionally, when determining the gesture corresponding to each of the at least one hand region according to the hand image information and/or the hand motion information of each of the at least one hand region, the processor is configured to:

in response to that the second recognition result is no, obtain a third recognition result by performing a second single-hand dynamic gesture recognition based on the hand image information and the hand motion information of the hand region; and in response to that the third recognition result is yes, determine that the gesture corresponding to the hand region is the single-hand dynamic gesture.

Optionally, when detecting the at least one hand region from the video image, the processor is configured to: determine that there are at least two hand regions by detecting the video image; and when determining the gesture corresponding to each of the at least one hand region according to the hand image information and/or the hand motion information of each of the at least one hand region, the processor is configured to:

for any two hand regions, determine a confidence level of the two hand regions belonging to two hands of a same person according to the hand image information and the hand motion information of the two hand regions;

in response to that one or more confidence levels are greater than a preset threshold, determine that the two hand regions with the highest confidence level belong to two hands of a same person;

obtain a fourth recognition result by performing a double-hand static gesture recognition for the hand image information of the two hand regions belonging to two hands of a same person;

in response to that the fourth recognition result is yes, determine that the gesture corresponding to the two hand regions is the double-hand static gesture.

Optionally, when determining the gesture corresponding to each of the at least one hand region according to the hand image information and/or the hand motion information of each of the at least one hand region, the processor is configured to:

in response to the fourth recognition result is no, obtain a fifth recognition result by performing a first double-hand dynamic gesture recognition based on the hand motion information of the two hand regions;

in response to that the fifth recognition result is yes, determine that the gesture corresponding to the two hand regions is the double-hand dynamic gesture.

Optionally, when determining the gesture corresponding to each of the at least one hand region according to the hand image information and/or the hand motion information of each of the at least one hand region, the processor is configured to:

in response to that the fifth recognition result is no, obtain a sixth recognition result by performing a second double-hand dynamic gesture recognition based on the hand image information and the hand motion information of the two hand regions;

in response to that the sixth recognition result is yes, determine that the gesture corresponding to the two hand regions is the double-hand dynamic gesture.

Optionally, when determining, for any two hand regions, the confidence level of the two hand regions belonging to two hands of a same person according to the hand image information and the hand motion information of the two hand regions, the processor is configured to:

in response to that no confidence level is greater than the preset threshold, separately perform a single-hand gesture recognition for each of the at least one hand region; where the single-hand gesture recognition includes at least one of a single-hand static gesture recognition, a first single-hand dynamic gesture recognition, or a second single-hand dynamic gesture recognition.

Optionally, when obtaining the hand motion information of each of the at least one hand region by tracking the at least one hand region, the processor is configured to:

obtain one or more prediction results by predicting the hand motion information of each of the at least one hand region based on a prediction model; where the hand motion information includes a hand position and a hand motion speed;

match the one or more prediction results with one or more detection results of the hand motion information of the at least one hand region in a current frame of video image;

update one or more parameters of the prediction model using one or more of the detection results matched with the one or more prediction results;

track each of the at least one hand region; and obtain the hand motion information of each of the at least one hand region by obtaining the hand motion information of a tracked same hand region.

Still another aspect of the present application provides a computer readable storage medium, storing computer instructions, where the computer instructions are run on a computer to:

detect at least one hand region from a video image, and obtain hand image information of each of the at least one hand region;

obtain hand motion information of each of the at least one hand region by tracking the at least one hand region; and determine a gesture corresponding to each of the at least one hand region based on the hand image information and/or the hand motion information of each of the at least one hand region; where the gesture includes at least one of a single-hand static gesture, a single-hand dynamic gesture, a double-hand static gesture or a double-hand dynamic gesture.

BRIEF DESCRIPTION OF DRAWINGS

The above and/or additional aspects and advantages of the present disclosure will become apparent and understandable from the descriptions of the embodiments made in combination with the accompanying drawings.

DETAILED DESCRIPTION

The embodiments of the present disclosure will be described below in details with the examples thereof shown in the accompanying drawings, and the same or similar reference numerals represent same or similar elements or elements having same or similar function throughout the specification. Furthermore, those detailed descriptions in the prior art unnecessary for the shown features of the present disclosure may be omitted. The embodiments described below by referring to the accompanying drawings are merely illustrative to explain the present disclosure rather than limit the present disclosure.

Those skilled in the art may understand that unless otherwise defined, all terms (including technical terms and scientific terms) used herein shall have the same meanings as the persons of ordinary skill generally understand in the field of the present disclosure. It should be further understood that those terms defined in a common dictionary shall be understood as having the meanings consistent with the meanings in the context of the prior art, and will not be explained ideally or too formally unless otherwise specifically defined herein.

Those skilled in the art may understand that, unless otherwise stated, the terms such as "one" "a", "said" and "the" in the singular form may include plural. It should be further understood that the word "include" used in the specification of the present disclosure refers to presence of the feature, integer, step, operation, element and/or component and does not preclude presence or addition of one or more other features, integers, steps, operations, elements, components and/or their combinations. It should be understood that when we say that an element is connected or coupled to another element, it may be connected or coupled to another element directly or through an intermediate element. Further, the "connect" or "couple" used herein may include wireless connection or wireless coupling. It should be understood that the word "and/or" used herein includes all or any one unit or all combinations of one or more associated listed items.

Figure 1:
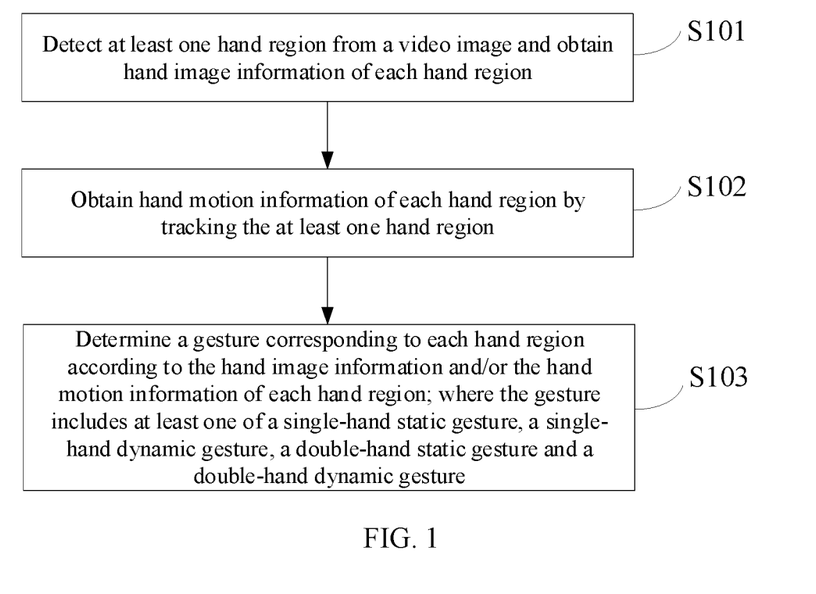
FIG. 1 is a flowchart of a method of recognizing a gesture according to an embodiment of the present disclosure.

An embodiment of the present disclosure provides a method of recognizing a gesture. As shown in FIG. 1, the method includes the following steps S101-S103.

At step S101, at least one hand region is detected from a video image and hand image information of each hand region is obtained.

Optionally, the hand region is a region corresponding to a hand of a person in the video image.

Optionally, a hand detection model in the embodiment of the present disclosure is a CNN-based lightweight detection model (backbone network is SSD network of mobilenet), which is specially designed for an embedded system.

At step S102, hand motion information of each hand region is obtained by tracking the at least one hand region.

At step S103, a gesture corresponding to each hand region is determined according to the hand image information and/or the hand motion information of each hand region; where the gesture includes at least one of a single-hand static gesture, a single-hand dynamic gesture, a double-hand static gesture and a double-hand dynamic gesture.

Optionally, in the embodiment of the present disclosure, one or two hand regions are taken as one gesture recognition object and correspond to one gesture.

Optionally, each of the single-hand static gesture, the single-hand dynamic gesture, the double-hand static gesture and the double-hand dynamic gesture may include several different gestures according to actual applications.

For example, the single-hand static gesture includes the static gestures involving one hand representing ok, good, scissors, palm, first and the like.

For example, the single-hand dynamic gesture includes the dynamic gestures involving one hand representing mouse click, turning (page) left, turning (page) right, turning (page) upward, turning (page) downward, transverse cut, vertical cut, oblique cut, no and the like. For example, opening one hand and then making a first means clicking a mouse to open a file on a display interface. For another example, swiping one hand from left to right means moving right a mouse to synchronously move right a mouse pointer on the display interface. For another example, moving one hand from right to left means turning (page) left to turn the contents of the display interface to the next page.

For example, the double-hand static gesture includes the static gestures involving two hands representing awesome (left and right hands thumb up respectively), photographing, putting palms together, loving heart and the like.

For example, the double-hand dynamic gesture includes the dynamic gestures involving two hands representing opening (book), closing (book) and the like.

In the embodiments of the present disclosure, several gestures such as the single-hand gestures, the double-hand gestures, the static gestures and the dynamic gestures can be accurately recognized in real time based on hand image information and/or hand motion information.

In some embodiments, detecting at least one hand region from the video image includes: determining that there is only one hand region by detecting the video image; and determining the gesture corresponding to each hand region according to the hand image information and/or the hand motion information of each hand region includes: obtaining a first recognition result by performing a single-hand static gesture recognition for the hand image information of the hand region; in response to that the first recognition result is yes, determining that the gesture corresponding to the hand region is the single-hand static gesture.

Optionally, the single-hand static gesture recognition is a recognition performed for a single-hand region image by using the CNN-based lightweight model (classification network based on mobilenet).

In some embodiments, determining the gesture corresponding to each hand region according to the hand image information and/or the hand motion information of each hand region comprises:

in response to that the first recognition result is no, obtaining a second recognition result by performing a first single-hand dynamic gesture recognition based on the hand motion information of the hand region; and in response to that the second recognition result is yes, determining that the gesture corresponding to the hand region is the single-hand dynamic gesture.

Optionally, the first single-hand dynamic gesture recognition is a dynamic gesture recognition manner used to perform quick recognition for the hand motion information obtained by tracking a single hand region in a case of not recognizing a gesture in the single-hand static gesture recognition.

Optionally, the first single-hand dynamic gesture recognition is a quick recognition performed based directly on the hand motion information. For example, for recognizing a single hand moving from left to right, from right to left, from top to bottom and from bottom to top and the like, the single-hand dynamic gesture can be recognized only based on position movement information, so as to perform quick recognition.

In some embodiments, determining the gesture corresponding to each hand region according to the hand image information and/or the hand motion information of each hand region comprises:

in response to that the second recognition result is no, obtaining a third recognition result by performing a second single-hand dynamic gesture recognition based on the hand image information and the hand motion information of the hand region; and in response to that the third recognition result is yes, determining that the gesture corresponding to the hand region is the single-hand dynamic gesture.

Optionally, the second single-hand dynamic gesture recognition is a comprehensive dynamic gesture recognition manner used in a case of not recognizing a gesture by performing quick recognition in the first single-hand dynamic gesture recognition. The second single-hand dynamic gesture recognition is to perform comprehensive analysis and recognition for the hand motion information obtained by tracking the hand region and the information of a plurality of successive frames of hand images by using the CNN-based lightweight model (classification network based on mobilenet), so as to accurately recognize the gesture corresponding to the hand region.

In some embodiments, detecting at least one hand region from the video image includes: determining that there are at least two hand regions by detecting the video image; and determining the gesture corresponding to each hand region according to the hand image information and/or the hand motion information of each hand region includes: for any two hand regions, determining a confidence level of the two hand regions belonging to two hands of a same person according to the hand image information and the hand motion information of the two hand regions;

in response to that one or more confidence levels are greater than a preset threshold, determining that the two hand regions with the highest confidence level belong to two hands of a same person;

obtaining a fourth recognition result by performing a double-hand static gesture recognition for the hand image information of the two hand regions belonging to two hands of a same person;

in response to that the fourth recognition result is yes, determining that the gesture corresponding to the two hand regions is the double-hand static gesture.

Optionally, the double-hand static gesture recognition is a recognition performed for the hand image information of the two hand regions by using the CNN-based lightweight model (classification network based on mobilenet).

In the embodiments of the present disclosure, confidence levels that a plurality of random pairs of hand regions possibly each belong to two hands of a same person are obtained by performing analysis for a relative positional relationship and hand region images of the two hand regions using the CNN-based lightweight model (classification network based on mobilenet), and one or more pairs of hand regions with the confidence level greater than the threshold are selected as candidate pairs of hand regions belonging to two hands of a same person. In a case of logic contradiction, a pair of hand regions with a greater/the greatest confidence level is selected.

In some embodiments, determining the gesture corresponding to each hand region according to the hand image information and/or the hand motion information of each hand region includes:

in response to the fourth recognition result is no, obtaining a fifth recognition result by performing a first double-hand dynamic gesture recognition based on the hand motion information of the two hand regions;

in response to that the fifth recognition result is yes, determining that the gesture corresponding to the two hand regions is the double-hand dynamic gesture.

Optionally, the first double-hand dynamic gesture recognition is a dynamic gesture recognition manner used to perform quick recognition for the hand motion information obtained by tracking two hand regions in a case of not recognizing a gesture in the double-hand static gesture recognition.

In some embodiments, determining the gesture corresponding to each hand region according to the hand image information and/or the hand motion information of each hand region includes:

in response to that the fifth recognition result is no, obtaining a sixth recognition result by performing a second double-hand dynamic gesture recognition based on the hand image information and the hand motion information of the two hand regions;

in response to that the sixth recognition result is yes, determining that the gesture corresponding to the two hand regions is the double-hand dynamic gesture.

In some embodiments, for any two hand regions, determining a confidence level of the two hand regions belonging to two hands of a same person according to the hand image information and the hand motion information of the two hand regions includes:

in response to that no confidence level is greater than the preset threshold, separately performing a single-hand gesture recognition with each hand region as a single hand; wherein the single-hand gesture recognition includes at least one of a single-hand static gesture recognition, a first single-hand dynamic gesture recognition, and a second single-hand dynamic gesture recognition.

Optionally, the second double-hand dynamic gesture recognition is a comprehensive dynamic gesture recognition manner used in a case of not recognizing a gesture by performing quick recognition in the first double-hand dynamic gesture recognition. The second double-hand dynamic gesture recognition is to perform comprehensive analysis and recognition for the hand motion information obtained by tracking two hand regions and the information of a plurality of successive frames of hand images of the two hand regions by using the CNN-based lightweight model (classification network based on mobilenet), so as to accurately recognize the gesture corresponding to the two hand regions.

Figure 2:
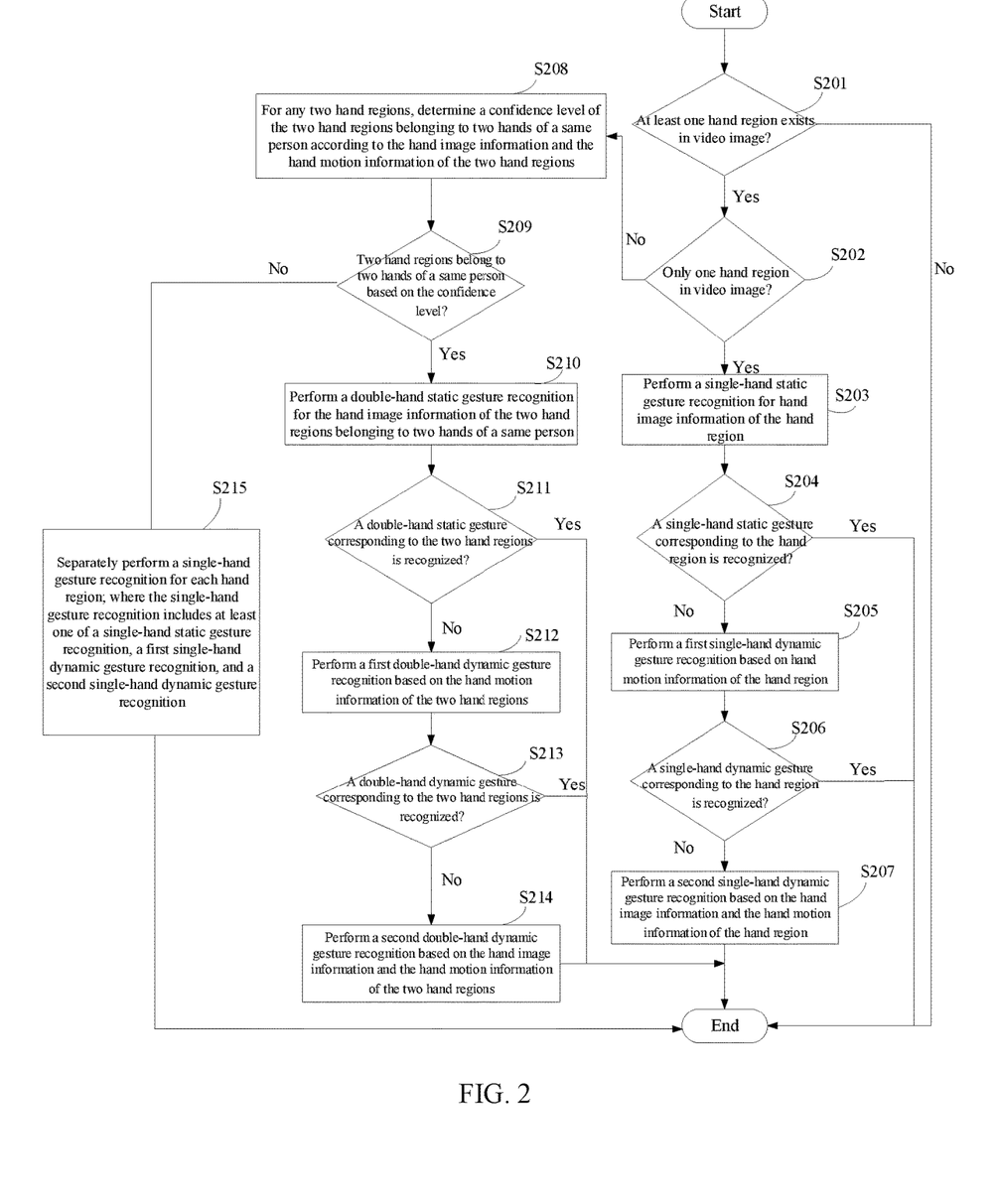
FIG. 2 is a flowchart of another method of recognizing a gesture according to an embodiment of the present disclosure.

As an example, an embodiment of the present disclosure provides a method of recognizing a gesture. As shown in FIG. 2, the method includes the following steps.

At step S201, whether there is a hand region in a video image is determined; if there is a hand region in the video image, proceed to step S202 and otherwise, the process is ended.

At step S202, whether there is only one hand region in the video image is determined; if there is only one hand region in the video image, proceed to step S203 and otherwise proceed to step S208.

At step S203, a single-hand static gesture recognition is performed for hand image information of the hand region.

At step S204, whether a single-hand static gesture corresponding to the hand region is recognized is determined; if a single-hand static gesture corresponding to the hand region is recognized, the process is ended, and otherwise, proceed to step S205.

Optionally, if the single-hand static gesture corresponding to the hand region is recognized, the recognized single-hand static gesture is taken as a gesture corresponding to the hand region and the recognition process is ended.

At step S205, a first single-hand dynamic gesture recognition is performed based on hand motion information of the hand region.

At step S206, whether a single-hand dynamic gesture corresponding to the hand region is recognized is determined; if a single-hand dynamic gesture corresponding to the hand region is recognized is determined, the process is ended; and otherwise, proceed to step S207.

Optionally, if the single-hand dynamic gesture corresponding to the hand region is recognized, the recognized single-hand dynamic gesture is taken as a gesture corresponding to the hand region, and the recognition process is ended.

At step S207, a second single-hand dynamic gesture recognition is performed based on the hand image information and the hand motion information of the hand region, and then the recognition process is ended.

Optionally, the step S207 further includes determining whether a single-hand dynamic gesture corresponding to the hand region is recognized; if yes, taking the recognized single-hand dynamic gesture as a gesture corresponding to the hand region, and ending the recognition process; otherwise, directly ending the process.

At step S208, for any two hand regions, a confidence level of the two hand regions belonging to two hands of a same person is determined according to the hand image information and the hand motion information of the two hand regions.

Optionally, in response to that one or more confidence levels are greater than a preset threshold, it is determined that the two hand regions with the highest confidence level belong to two hands of a same person.

At S209, whether the two hand regions belong to two hands of a same person is determined based on the confidence level; if the two hand regions belong to two hands of a same person, proceed to step S210, and otherwise proceed to step S215.

At step S210, a double-hand static gesture recognition is performed for the hand image information of the two hand regions belonging to two hands of a same person.

At step S211, whether a double-hand static gesture corresponding to the two hand regions is recognized is determined; if a double-hand static gesture corresponding to the two hand regions is recognized, the process is ended; if not, proceed to the step S212.

Optionally, if the double-hand static gesture corresponding to the two hand regions is recognized, the recognized double-hand static gesture is taken as a gesture corresponding to the hand regions, and the recognition process is ended.

At step S212, a first double-hand dynamic gesture recognition is performed based on the hand motion information of the two hand regions.

At step S213, whether a double-hand dynamic gesture corresponding to the two hand regions is recognized is determined; if a double-hand dynamic gesture corresponding to the two hand regions is recognized, the process is ended; if a double-hand dynamic gesture corresponding to the two hand regions is not recognized, proceed to step S214.

Optionally, if the double-hand dynamic gesture corresponding to the two hand regions is recognized, the recognized double-hand dynamic gesture is taken as a gesture corresponding to the two hand regions.

At step S214, a second double-hand dynamic gesture recognition is performed based on the hand image information and the hand motion information of the two hand regions, and then the recognition process is ended.

Optionally, the step S214 further includes determining whether a double-hand dynamic gesture corresponding to the two hand regions is recognized; if a double-hand dynamic gesture corresponding to the two hand regions is recognized, taking the recognized double-hand dynamic gesture as a gesture corresponding to the two hand regions, and ending the recognition process; if a double-hand dynamic gesture corresponding to the two hand regions is not recognized, directly ending the process.

At step S215, a single-hand gesture recognition is separately performed for each hand region; where the single-hand gesture recognition includes at least one of a single-hand static gesture recognition, a first single-hand dynamic gesture recognition, and a second single-hand dynamic gesture recognition.

Optionally, the recognition process of the single-hand static gesture recognition, the first single-hand dynamic gesture recognition, and the second single-hand dynamic gesture recognition is identical to the process of the single-hand recognition method when only one hand region is detected.

Based on the above technical solution, the embodiments of the present disclosure on one hand, support both the single-hand gesture recognition and the double-hand gesture recognition, on the other hand, support both the static gesture recognition and the dynamic gesture recognition and fuse all of the recognitions together organically. Furthermore, for a plurality of hand regions present in the video image at the same time, a gesture corresponding to each hand region in the video image is obtained by tracking the plurality of hand regions and comprehensively analyzing.

Optionally, in the embodiments of the present disclosure, the hand detection aims to realize detection of the hand region in the video image, and the hand tracking aims to recognize different hand regions and obtain motion information of each hand region by continuously tracking a plurality of hand regions in the video image on the basis of the hand detection. In the embodiments of the present disclosure, the hand detection and the hand tracking are organically combined together to accurately recognize a gesture in real time.

Figure 3:
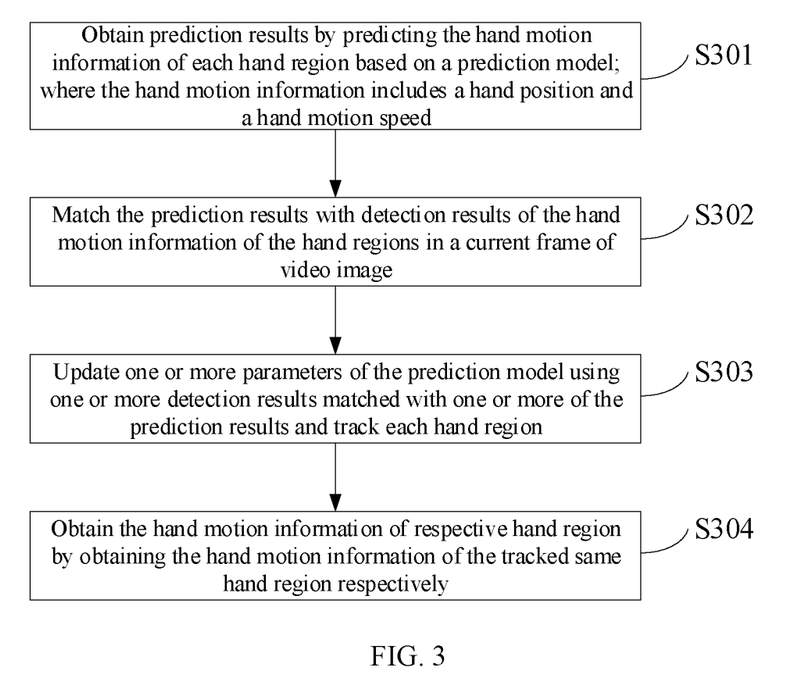
FIG. 3 is a flowchart of obtaining hand motion information of each hand region by tracking at least one hand region according to an embodiment of the present disclosure.

In some embodiments, there is provided a method of obtaining the hand motion information of each hand region by tracking at least one hand region in step S102. As shown in FIG. 3, the method includes steps S301 to S304.

At step S301, prediction results are obtained by predicting the hand motion information of each hand region based on a prediction model; where the hand motion information includes a hand position and a hand motion speed.

Optionally, the prediction model is a model of a quick tracking algorithm based on Kalman filtering. In the embodiments of the present disclosure, in combination with the hand image information of each hand region obtained, image features can be efficiently extracted to improve tracking stability, so as to facilitate continuously tracking a same hand region and avoiding loss.

At step S302, the prediction results are matched with detection results of the hand motion information of the hand regions in a current frame of video image.

At step S303, one or more parameters of the prediction model are updated using one or more detection results matched with one or more of the prediction results and each hand region is tracked.

At step S304, the hand motion information of respective hand region is obtained by obtaining the hand motion information of the tracked same hand region respectively.

Optionally, based on the above method of obtaining the hand motion information of each hand region by tracking at least one hand region, the tracking for the hand region in the embodiments of the present disclosure is an iterative process. Taking processing of one video image as an example, the process of obtaining the hand motion information of each hand region by obtaining the hand motion information of the tracked same hand region includes the following steps.

At step 1, one or more prediction results, tracks, are obtained by predicting the hand motion information of each hand region using the quick tracking algorithm based on Kalman filtering.

At step 2, the prediction results, tracks, obtained by prediction are matched with one or more detection results, detections, of the hand detection of the current video image based on Hungarian algorithm to obtain paired data (track and detection), where the match includes image feature match and regional position match.

At step 3, one or more Kalman filtering parameters are updated using one or more detection results, detections, matched with one or more prediction results, tracks and each hand region is tracked.

At step 4, the hand motion information of each hand region is obtained by obtaining the hand motion information of the tracked same hand region.

For example, Frame 0: a detector detects three detections, there are no tracks currently, and the three detections are initialized into tracks.

Frame 1: the detector detects three more detections, for the tracks in Frame 0, firstly new tracks are obtained by prediction, then the new tracks are matched with the detections based on Hungarian algorithm to obtain one or more matching pairs (track and detection), and finally, the corresponding track is updated using the detection in each pair.

Optionally, in the above step 2, image feature matching and regional Intersection over Union (IOU) feature matching are performed for the prediction results, tracks, obtained by prediction and the detection results, detections, of the hand detection of the current video image.

Firstly, an efficient image feature such as color feature, or Histogram of Oriented Gradient (HOG) feature is selected based on feature engineering method. The efficient feature selection is performed in such a way that the hands corresponding to different hand regions can be effectively distinguished and quick extraction processing can be performed in an embedded system due to low computation complexity at the same time. The extraction of the image feature is used to improve the tracking stability.

Next, matching is performed for the tracks and the detections in terms of the image feature and the regional IOU feature. The image feature matching is performed based on a cosine distance of a feature vector, and the regional IOU feature matching is performed based on the maximum value.

The cosine distance is an algorithm of the feature vector for describing relationship closeness. Geometrically, when an included angle of two vectors is almost 0, the two vectors are very similar. When the included angle is 0, the relationship of the two vectors is closest and the cosine value at this time is 1. When the two vectors are mutually perpendicular, the cosine value is 0 and the relevance is the poorest or the relationship is called mutual independence.

The IOU is a criterion for detecting an accuracy of corresponding objects in a particular dataset, which is a result obtained by dividing an overlapping part (intersection) of the two regions by a union part of the two regions. The IOU calculation result is compared with a set threshold to evaluate relevance between truth and prediction. The higher the relevance, the higher the IOU.

Based on the above technical solution, the embodiments of the present disclosure can satisfy the requirements of real-time gesture recognition. A lightweight and fast model is selected during model designing, and special acceleration and compression processing can also be performed for the model, including model quantization, pruning, and distillation. At the same time, in the embodiments of the present disclosure, the hand image information and the hand motion information of each hand region may be obtained, the data collection and algorithm processing are performed in parallel in multiple threads, and the data collection does not occupy the main flow time.

Figure 4:
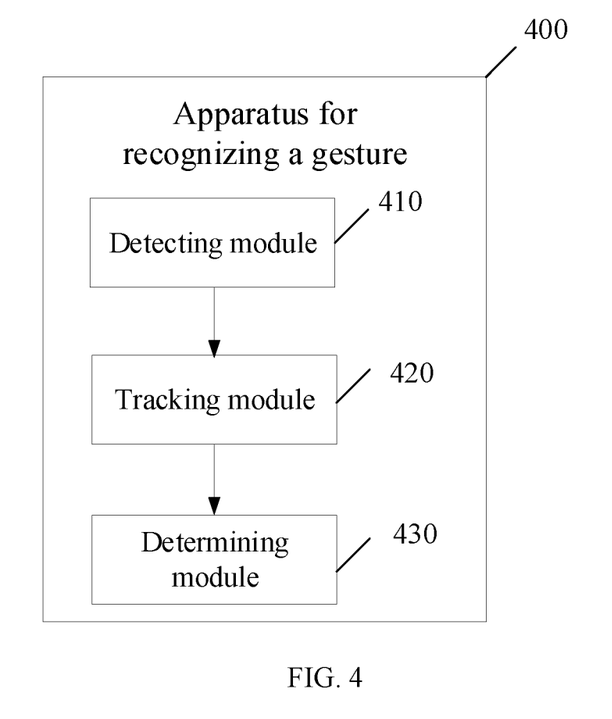
FIG. 4 is a structural schematic diagram of an apparatus for recognizing a gesture according to an embodiment of the present disclosure.

Based on the same invention concept, an embodiment of the present disclosure provides an apparatus for recognizing a gesture. As shown in FIG. 4, the apparatus 400 includes a detecting module 410, a tracking module 420 and a determining module 430.

The detecting module 410 is configured to detect at least one hand region from a video image and obtain hand image information of each hand region.

The tracking module 420 is configured to obtain hand motion information of each hand region by tracking at least one hand region.

The determining module 430 is configured to determine a gesture corresponding to each hand region according to the hand image information and/or the hand motion information of each hand region; where the types of the gestures includes single-hand static gesture, single-hand dynamic gesture, double-hand static gesture and double-hand dynamic gesture.

Optionally, the detecting module 410 is configured to determine that there is only one hand region by detecting the video image.

Optionally, the determining module 430 is configured to: obtain a first recognition result by performing a single-hand static gesture recognition for the hand image information of the hand region; in response to that the first recognition result is yes, determine that a gesture corresponding to the hand region is the single-hand static gesture.

Optionally, the determining module 430 is configured to, in response to the first recognition result is no, obtain a second recognition result by performing a first single-hand dynamic gesture recognition based on the hand motion information of the hand region; in response to that the second recognition result is yes, determine that the gesture corresponding to the hand region is the single-hand dynamic gesture.

Optionally, the determining module 430 is configured to: in response to that the second recognition result is no, obtain a third recognition result by performing a second single-hand dynamic gesture recognition based on the hand image information and the hand motion information of the hand region; in response to that the third recognition result is yes, determine that the gesture corresponding to the hand region is the single-hand dynamic gesture.

Optionally, the detecting module 410 is configured to determine that there are at least two hand regions by detecting the video image.

Optionally, the determining module 430 is configured to: for any two hand regions, determine a confidence level of the two hand regions belonging to two hands of a same person according to the hand image information and the hand motion information of the two hand regions; in response to that one or more confidence levels are greater than a preset threshold, determine that the two hand regions with the highest confidence level belong to two hands of a same person; obtain a fourth recognition result by performing a double-hand static gesture recognition for the hand image information of the two hand regions belonging to two hands of a same person; in response to that the fourth recognition result is yes, determine that the gesture corresponding to the two hand regions is the double-hand static gesture.

Optionally, the determining module 430 is configured to: in response to the fourth recognition result is no, obtain a fifth recognition result by performing a first double-hand dynamic gesture recognition based on the hand motion information of the two hand regions; in response to that the fifth recognition result is yes, determine that the gesture corresponding to the two hand regions is the double-hand dynamic gesture.

Optionally, the determining module 430 is configured to: in response to that the fifth recognition result is no, obtain a sixth recognition result by performing a second double-hand dynamic gesture recognition based on the hand image information and the hand motion information of the two hand regions; in response to that the sixth recognition result is yes, determine that the gesture corresponding to the two hand regions is the double-hand dynamic gesture.

Optionally, the determining module 430 is configured to: in response to that no confidence level of two hand regions belonging to two hands of a same person is greater than the preset threshold, separately perform a single-hand gesture recognition for each hand region; where the single-hand gesture recognition includes at least one of single-hand static gesture recognition, first single-hand dynamic gesture recognition, and second single-hand dynamic gesture recognition.

Optionally, the tracking module 420 is configured to: obtain one or more prediction results by predicting the hand motion information of each hand region based on a prediction model, where the hand motion information includes a hand position and a hand motion speed; match the one or more prediction results with one or more detection results of the hand motion information of the hand region in a current video image; update one or more parameters of the prediction model using one or more detection results matched with one or more prediction results; and obtain the hand motion information of each hand region by obtaining the hand motion information of a tracked same hand region.

Based on the same invention concept, an embodiment of the present disclosure provides an electronic device, including:

a processor;

a memory, in communication connection with the processor;

at least one program, stored in the memory and configured to be executed by the processor, where the at least one program is configured to implement the method of recognizing a gesture according to any one embodiment of the present disclosure.

Those skilled in the art may understand that the electronic device provided by the embodiments of the present disclosure may be specially designed and manufactured for a desired purpose, or may include a known device in a general-purpose computer. These devices have computer programs stored therein and these computer programs may be selectively activated or reconstructed. Such computer program may be stored in a device (e.g. computer) readable storage medium or stored in any type of medium suitable for storing electronic instructions and being respectively coupled to a bus.

Figure 5:
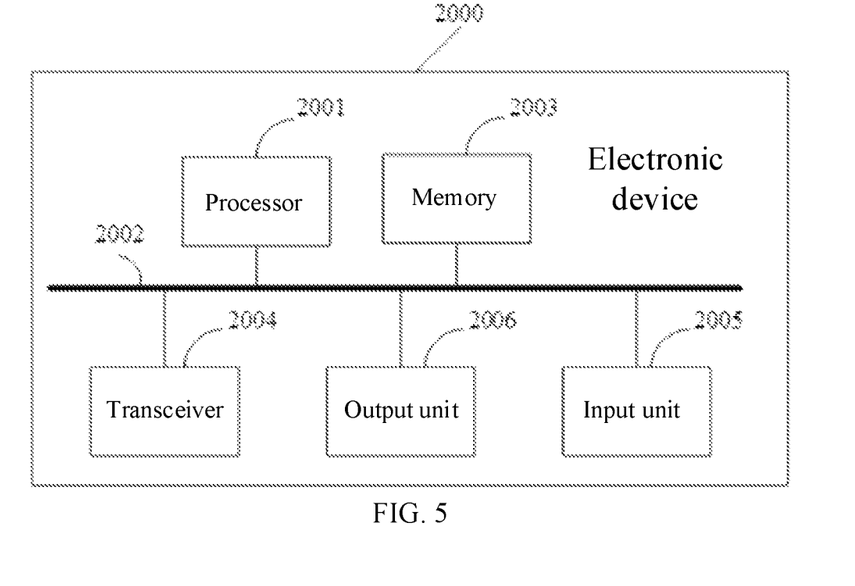
FIG. 5 is a block diagram of a structure of an electronic device according to an embodiment of the present disclosure.

In an optional embodiment, the present disclosure provides an electronic device. As shown in FIG. 5, the electronic device 2000 includes a processor 2001, and a memory 2003. The processor 2001 is in communication connection with the memory 2003, for example, via a bus 2002.

The processor 2001 may be a central processing unit (CPU), a general-purpose processor, a digital signal processor (DSP), an Application Specific Integrated Circuit (ASIC), a Field-Programmable Gate Array (FPGA), or another programmable logic device, transistor logic device, hardware component or any combination thereof, which can implement or perform various logic blocks, modules and circuits described in combination with the contents of the present disclosure. The processor 2001 may also be a combination for realizing a computing function, for example, a combination of one or more microprocessors, or a combination of DSP and microprocessor or the like.

The bus 2002 may include a passage for transmitting information among the above components. The bus 2002 may be a Peripheral Component Interconnect (PCI) bus or an Extended Industry Standard Architecture (EISA) bus or the like. The bus 2002 may include an address bus, a data bus and a control bus and the like. For ease of representation, only one thick line is depicted in FIG. 5, which does not mean there is only one bus or one type of bus.

The memory 2003 may be Read-Only Memory (ROM) or another type of static storage device capable of storing static information or instructions, random access memory (RAM) or another type of dynamic storage device capable of storing information and instructions, or may be Electrically Erasable Programmable Read Only Memory (EEPROM), Compact Disc Read-Only Memory (CD-ROM) or another compact disc storage, optical disc storage (including compact disc, laser disc, optical disc, digital versatile disc, blue-ray disc and the like), magnetic disc storage medium or another magnetic storage device, or any other medium capable of carrying or storing desired program codes of instruction or data structure form and being accessible by a computer, which is not limited herein.

Optionally, the electronic device 2000 may also include a transceiver 2004. The transceiver 2004 may be used to receive and send signals. The transceiver 2004 may allow the electronic device 2000 to communicate with other devices in a wireless or wired manner for data exchange. It is to be noted that in an actual application, the transceiver 2004 is not limited to one.

Optionally, the electronic device 2000 may also include an inputting unit 2005. The inputting unit 2005 may be configured to receive input information such as digits, characters, images and/or voices, or generate keying signal inputs relating to user setting and function control of the electronic device 2000. The inputting unit 2005 may include but not limited to one or more of a touch screen, a physical keyboard, a functional key (e.g. volume control key, and on/off key and the like), a trajectory ball, a mouse, an operation rod, a shooting device, and a sound pickup and the like.

Optionally, the electronic device 2000 may also include an outputting unit 2006. The outputting unit 2006 may be configured to output or display information processed by the processor 2001. The outputting unit 2006 may include but not limited to one or more of a display apparatus, a loudspeaker, a vibration apparatus and the like.

Although FIG. 5 shows the electronic device 2000 having various apparatuses, it should be understood that it is not required to implement or have all shown apparatuses, but may implement or have more or fewer apparatuses alternatively.

Optionally, the memory 2003 is configured to store application program codes for performing the solution of the present disclosure, which are controlled and executed by the processor 2001. The processor 2001 is used to execute the application program codes stored in the memory 2003 to implement the method of recognizing a gesture according to any one embodiment of the present disclosure.

Based on the same invention concept, an embodiment of the present disclosure provides a computer readable storage medium, storing computer instructions. The computer instructions can be run on a computer to implement the method of recognizing a gesture according to any one embodiment of the present disclosure.

Those skilled in the art may understand that the steps, measures and solutions in various operations, methods and flows discussed in the present disclosure may be alternated, changed, combined or deleted. Furthermore, other steps, measures and solutions having various operations, methods and flows discussed in the present disclosure may also be alternated, changed, re-arranged, decomposed, combined or deleted. Further, the steps, measures and solutions having various operations, methods and flows discussed in the present disclosure in the prior art may also be alternated, changed, re-arranged, decomposed, combined or deleted.

In the description of the present disclosure, it is to be understood that orientations or positional relationships indicated by terms such as "center", "upper", "lower", "front", "rear", "left", "right", "vertical", "horizontal", "top", "bottom", "inside", "outside", and the like are based on orientations or positional relationships shown in the drawings and are used only for convenience and simplification of descriptions of the present disclosure, rather than indicating or implying that the indicated apparatus or element shall have a specific orientation and be configured or operated in a specific orientation. Thus, the terms shall not be understood as limiting of the present disclosure.

The terms "first" and "second" are used only for descriptions and shall not be understood as indicating or implying relative importance or implying a number of the indicated technical features. Thus, features limited by "first" and "second" may explicitly or implicitly include one or more features. In the descriptions of the present disclosure, "a plurality" refers to two or more unless otherwise stated clearly.

In the descriptions of the present disclosure, the terms such as "installed", "mutually connected", and "connected" are to be broadly understood unless otherwise clearly stated and defined. For example, two elements may be fixedly connected, detachably connected, or integrated into one piece; two elements may be directly connected, indirectly connected by an intermediate medium, or internally communicated. Persons of ordinary skill in the art may understand specific meanings of the above terms in the present disclosure according to a specific situation.

In the descriptions of the present disclosure, the specific features, structures, materials, or characteristics may be combined in an appropriate manner in one or more embodiments or examples.

It should be understood that although various steps in the flowchart of the accompanying drawings are displayed in a sequence as indicated by an arrow, these steps are not necessarily performed in the sequence indicated by the arrow. Unless otherwise clearly stated in the present disclosure, these steps are not limited to any strict sequence and may be performed in another sequence. Furthermore, at least part of the steps in the flowchart of the accompanying drawings may include a plurality of sub-steps or a plurality of stages. These sub-steps or stages are not necessarily completed at a same moment but may be performed at different moments. These sub-steps or stages are also not necessarily performed in sequence but may be performed in turns or alternately with at least part of other steps or the sub-steps or stages of other steps.

The above descriptions are made to merely some embodiments of the present disclosure. It should be pointed out that those skilled in the art may also make several improvements and modifications without departing from the principle of the present disclosure, and these improvements and modifications shall all fall within the scope of protection of the present disclosure.

What is claimed is:

1. A method of recognizing a gesture, comprising:
   detecting at least one hand region from a video image and obtaining hand image information of each of the at least one hand region;
   obtaining hand motion information of each of the at least one hand region by tracking the at least one hand region;
   determining a gesture corresponding to each of the at least one hand region according to the hand image information and/or the hand motion information of each of the at least one hand region; wherein the gesture comprises at least one of a single-hand static gesture, a single-hand dynamic gesture, a double-hand static gesture or a double-hand dynamic gesture;
   wherein detecting the at least one hand region from the video image comprises:
      determining that there is only one hand region by detecting the video image; and
   determining the gesture corresponding to each of the at least one hand region according to the hand image information and/or the hand motion information of each of the at least one hand region comprises:
      obtaining a first recognition result by performing a single-hand static gesture recognition for the hand image information of the hand region; and
      in response to that the first recognition result is yes, determining that the gesture corresponding to the hand region is the single-hand static gesture;
   wherein determining the gesture corresponding to each of the at least one hand region according to the hand image information and/or the hand motion information of each of the at least one hand region comprises:
      in response to that the first recognition result is no, obtaining a second recognition result by performing a first single-hand dynamic gesture recognition based on the hand motion information of the hand region; and
      in response to that the second recognition result is yes, determining that the gesture corresponding to the hand region is the single-hand dynamic gesture;
   wherein determining the gesture corresponding to each of the at least one hand region according to the hand image information and/or the hand motion information of each of the at least one hand region comprises:
      in response to that the second recognition result is no, obtaining a third recognition result by performing a second single-hand dynamic gesture recognition based on the hand image information and the hand motion information of the hand region; and
      in response to that the third recognition result is yes, determining that the gesture corresponding to the hand region is the single-hand dynamic gesture.

2. The method according to claim 1, wherein obtaining the hand motion information of each of the at least one hand region by tracking the at least one hand region comprises:
   obtaining one or more prediction results by predicting the hand motion information of each of the at least one hand region based on a prediction model; wherein the hand motion information comprises a hand position and a hand motion speed;
   matching the one or more prediction results with one or more detection results of the hand motion information of the at least one hand region in a current frame of video image;
   updating one or more parameters of the prediction model using one or more of the detection results matched with the one or more prediction results;
   tracking each of the at least one hand region; and
   obtaining the hand motion information of each of the at least one hand region by obtaining the hand motion information of a tracked same hand region.

3. An electronic device, comprising:
   a processor;
   a memory, in communication connection with the processor;
   at least one program, stored in the memory and configured to be executed by the processor; wherein the at least one program is executed by the processor to implement the method according to claim 1.

4. The electronic device according to claim 3, wherein when obtaining the hand motion information of each of the at least one hand region by tracking the at least one hand region, the processor is configured to:
   obtain one or more prediction results by predicting the hand motion information of each of the at least one hand region based on a prediction model; wherein the hand motion information comprises a hand position and a hand motion speed;
   match the one or more prediction results with one or more detection results of the hand motion information of the at least one hand region in a current frame of video image;
   update one or more parameters of the prediction model using one or more of the detection results matched with the one or more prediction results;
   track each of the at least one hand region; and
   obtain the hand motion information of each of the at least one hand region by obtaining the hand motion information of a tracked same hand region.

5. A non-transitory computer readable storage medium, storing computer instructions, wherein the computer instructions are run on a computer to implement the method according to claim 1.

6. A method of recognizing a gesture, comprising:
   detecting at least one hand region from a video image and obtaining hand image information of each of the at least one hand region;
   obtaining hand motion information of each of the at least one hand region by tracking the at least one hand region;
   determining a gesture corresponding to each of the at least one hand region according to the hand image information and/or the hand motion information of each of the at least one hand region; wherein the gesture comprises at least one of a single-hand static gesture, a single-hand dynamic gesture, a double-hand static gesture or a double-hand dynamic gesture, wherein detecting the at least one hand region from the video image comprises:
determining that there are at least two hand regions by detecting the video image; and determining the gesture corresponding to each of the at least one hand region according to the hand image information and/or the hand motion information of each of the at least one hand region comprises:
for any two hand regions, determining a confidence level of the two the hand regions belonging to two hands of a same person according to the hand image information and the hand motion information of the two hand regions;
in response to that one or more confidence levels are greater than a preset threshold, determining that the two hand regions with the highest confidence level belong to two hands of a same person;
obtaining a fourth recognition result by performing a double-hand static gesture recognition for the hand image information of the two hand regions belonging to two hands of a same person; and
in response to that the fourth recognition result is yes, determining that the gesture corresponding to the two hand regions is the double-hand static gesture.

7. The method according to claim 6, wherein determining the gesture corresponding to each of the at least one hand region according to the hand image information and/or the hand motion information of each of the at least one hand region comprises:
in response to the fourth recognition result is no, obtaining a fifth recognition result by performing a first double-hand dynamic gesture recognition based on the hand motion information of the two hand regions; and
in response to that the fifth recognition result is yes, determining that the gesture corresponding to the two hand regions is the double-hand dynamic gesture.

8. The method according to claim 7, wherein determining the gesture corresponding to each of the at least one hand region according to the hand image information and/or the hand motion information of each of the at least one hand region comprises:
in response to that the fifth recognition result is no, obtaining a sixth recognition result by performing a second double-hand dynamic gesture recognition based on the hand image information and the hand motion information of the two hand regions;
in response to that the sixth recognition result is yes, determining that the gesture corresponding to the two hand regions is the double-hand dynamic gesture.

9. The method according to claim 6, wherein for any two hand regions, determining the confidence level that the two hand regions belonging to two hands of a same person according to the hand image information and the hand motion information of the two hand regions comprises:
in response to that no confidence level is greater than the preset threshold, separately performing a single-hand gesture recognition for each of the at least one hand region; wherein the single-hand gesture recognition comprises at least one of a single-hand static gesture recognition, a first single-hand dynamic gesture recognition, or a second single-hand dynamic gesture recognition.

10. The method according to claim 6, wherein obtaining the hand motion information of each of the at least one hand region by tracking the at least one hand region comprises:

obtaining one or more prediction results by predicting the hand motion information of each of the at least one hand region based on a prediction model; wherein the hand motion information comprises a hand position and a hand motion speed;
matching the one or more prediction results with one or more detection results of the hand motion information of the at least one hand region in a current frame of video image;
updating one or more parameters of the prediction model using one or more of the detection results matched with the one or more prediction results;
tracking each of the at least one hand region; and
obtaining the hand motion information of each of the at least one hand region by obtaining the hand motion information of a tracked same hand region.

11. An electronic device, comprising:
a processor;
a memory, in communication connection with the processor;
at least one program, stored in the memory and configured to be executed by the processor; wherein the at least one program is configured to:
detect at least one hand region from a video image and obtain hand image information of each of the at least one hand region;
obtain hand motion information of each of the at least one hand region by tracking the at least one hand region;
determine a gesture corresponding to each of the at least one hand region according to the hand image information and/or the hand motion information of each of the at least one hand region; wherein the gesture comprises at least one of a single-hand static gesture, a single-hand dynamic gesture, a double-hand static gesture, or a double-hand dynamic gesture, wherein
when detecting the at least one hand region from the video image, the processor is configured to:
determine that there are at least two hand regions by detecting the video image; and
when determining the gesture corresponding to each of the at least one hand region according to the hand image information and/or the hand motion information of each of the at least one hand region, the processor is configured to:
for any two hand regions, determine a confidence level of the two hand regions belonging to two hands of a same person according to the hand image information and the hand motion information of the two hand regions;
in response to that one or more confidence levels are greater than a preset threshold, determine that the two hand regions with the highest confidence level belong to two hands of a same person;
obtain a fourth recognition result by performing a double-hand static gesture recognition for the hand image information of the two hand regions belonging to two hands of a same person;
in response to that the fourth recognition result is yes, determine that the gesture corresponding to the two hand regions is the double-hand static gesture.

12. The electronic device according to claim 11, wherein when obtaining the hand motion information of each of the at least one hand region by tracking the at least one hand region, the processor is configured to:
obtain one or more prediction results by predicting the hand motion information of each of the at least one hand region based on a prediction model; wherein the hand motion information comprises a hand position and a hand motion speed;

match the one or more prediction results with one or more detection results of the hand motion information of the at least one hand region in a current frame of video image;

update one or more parameters of the prediction model using one or more of the detection results matched with the one or more prediction results;

track each of the at least one hand region; and obtain the hand motion information of the at least one hand region by obtaining the hand motion information of a tracked same hand region.

13. The electronic device according to claim 12, wherein when determining the gesture corresponding to each of the at least one hand region according to the hand image information and/or the hand motion information of each of the at least one hand region, the processor is configured to:

in response to the fourth recognition result is no, obtain a fifth recognition result by performing a first double-hand dynamic gesture recognition based on the hand motion information of the two hand regions;

in response to that the fifth recognition result is yes, determine that the gesture corresponding to the two hand regions is the double-hand dynamic gesture.

14. The electronic device according to claim 13, wherein when determining the gesture corresponding to each of the at least one hand region according to the hand image information and/or the hand motion information of each of the at least one hand region, the processor is configured to:

in response to that the fifth recognition result is no, obtain a sixth recognition result by performing a second double-hand dynamic gesture recognition based on the hand image information and the hand motion information of the two hand regions;

in response to that the sixth recognition result is yes, determine that the gesture corresponding to the two hand regions is the double-hand dynamic gesture.

15. The electronic device according to claim 12, wherein when determining, for any two hand regions, the confidence level of the two hand regions belonging to two hands of a same person according to the hand image information and the hand motion information of the two hand regions, the processor is configured to:

in response to that no confidence level is greater than the preset threshold, separately perform a single-hand gesture recognition for each of the at least one hand region; wherein the single-hand gesture recognition comprises at least one of a single-hand static gesture recognition, a first single-hand dynamic gesture recognition, or a second single-hand dynamic gesture recognition.

16. A non-transitory computer readable storage medium, storing computer instructions, wherein the computer instructions are run on a computer to implement the method according to claim 6.

* * * * *